(12) United States Patent
Rensing

(10) Patent No.: US 10,670,446 B2
(45) Date of Patent: Jun. 2, 2020

(54) IN SITU TRANSDUCER CALIBRATION

(71) Applicant: Micro Motion, Inc., Boulder, CO (US)

(72) Inventor: Matthew Joseph Rensing, Cincinnati, OH (US)

(73) Assignee: Micro Motion, Inc., Boulder, CO (US)

( * ) Notice: Subject to any disclaimer, the term of this patent is extended or adjusted under 35 U.S.C. 154(b) by 254 days.

(21) Appl. No.: 15/763,258

(22) PCT Filed: Oct. 21, 2015

(86) PCT No.: PCT/US2015/056597
§ 371 (c)(1),
(2) Date: Mar. 26, 2018

(87) PCT Pub. No.: WO2017/069749
PCT Pub. Date: Apr. 27, 2017

(65) Prior Publication Data
US 2018/0356274 A1 Dec. 13, 2018

(51) Int. Cl.
*G01F 25/00* (2006.01)
*G01F 1/84* (2006.01)

(52) U.S. Cl.
CPC ............ *G01F 25/0007* (2013.01); *G01F 1/84* (2013.01); *G01F 1/8436* (2013.01)

(58) Field of Classification Search
CPC .. G01F 1/8436; G01F 1/8477; G01F 25/0007; G01F 1/8413; G01F 1/8431; G01F 1/845
See application file for complete search history.

(56) References Cited

U.S. PATENT DOCUMENTS

| | | | |
|---|---|---|---|
| 4,470,294 A | 9/1984 | Hamel | |
| 5,926,096 A * | 7/1999 | Mattar | ................... G01F 1/8413 340/606 |
| 6,378,354 B1 | 4/2002 | Sharp | |
| 6,782,333 B2 * | 8/2004 | Baker | ................... G01F 1/8413 702/104 |
| 7,185,526 B2 * | 3/2007 | Mattar | ..................... G01F 1/74 73/1.34 |
| 7,774,150 B2 * | 8/2010 | Stack | ..................... G01F 1/8413 702/54 |
| 7,865,318 B2 * | 1/2011 | Rensing | ................ G01F 1/8413 702/56 |
| 7,930,115 B2 * | 4/2011 | Gonia | ................... G01F 15/063 702/50 |
| 8,280,651 B2 * | 10/2012 | Rensing | ................ G01F 1/8413 702/56 |

(Continued)

FOREIGN PATENT DOCUMENTS

| | | |
|---|---|---|
| EP | 2019295 A1 | 1/2009 |
| JP | 2007078681 A | 3/2007 |
| WO | 2005045446 A2 | 5/2005 |

*Primary Examiner* — David A Rogers
(74) *Attorney, Agent, or Firm* — The Ollila Law Group LLC

(57) ABSTRACT

A method for calibrating a flowmeter (5) transducer is provided comprising the steps of exciting a vibration mode of a flowmeter (5) flow tube (130, 130') and ceasing to excite the vibration mode, wherein a free decay response of the flow tube (130, 130') is measured. Amplitudes and phases of the free decay response at a drive frequency are extracted, and a strength of the transducer is calculated.

16 Claims, 12 Drawing Sheets

(56) References Cited

U.S. PATENT DOCUMENTS

| | | | | |
|---|---|---|---|---|
| 8,483,979 B2* | 7/2013 | Henry | | G01F 1/8427 |
| | | | | 702/45 |
| 8,515,691 B2 | 8/2013 | Rieder et al. | | |
| 8,775,110 B2* | 7/2014 | Dutton | | G01F 1/8436 |
| | | | | 702/100 |
| 9,086,308 B2* | 7/2015 | Bierweiler | | G01F 1/74 |
| 9,091,580 B2* | 7/2015 | Henry | | G01F 1/8404 |
| 9,200,936 B2* | 12/2015 | Henry | | G01F 1/8404 |
| 9,279,710 B2* | 3/2016 | Henry | | G01F 1/8404 |
| 9,671,268 B2* | 6/2017 | Alves | | G01F 25/0007 |
| 9,689,736 B2* | 6/2017 | Plaziak | | G01F 25/0007 |
| 9,989,400 B2* | 6/2018 | Plaziak | | G01F 25/0007 |
| 10,409,294 B2* | 9/2019 | Cunningham | | G01F 1/84 |
| 2007/0017274 A1* | 1/2007 | Wheeler | | G01F 1/8413 |
| | | | | 73/1.16 |
| 2008/0184813 A1* | 8/2008 | Patten | | G01F 1/8413 |
| | | | | 73/861.355 |
| 2008/0281535 A1* | 11/2008 | Rensing | | G01F 1/8413 |
| | | | | 702/56 |
| 2010/0094570 A1* | 4/2010 | Gonia | | G01F 1/8427 |
| | | | | 702/49 |
| 2010/0281998 A1 | 11/2010 | Braun et al. | | |
| 2011/0154912 A1* | 6/2011 | Kumar | | G01F 1/8413 |
| | | | | 73/861.19 |
| 2011/0178738 A1* | 7/2011 | Rensing | | G01F 1/8413 |
| | | | | 702/56 |
| 2013/0055827 A1* | 3/2013 | Bierweiler | | G01F 1/74 |
| | | | | 73/861.355 |
| 2013/0228003 A1* | 9/2013 | Bierweiler | | G01F 1/8436 |
| | | | | 73/1.16 |
| 2015/0276451 A1* | 10/2015 | Alves | | G01F 25/0007 |
| | | | | 73/861.357 |
| 2016/0116319 A1* | 4/2016 | Rensing | | G01F 1/8477 |
| | | | | 73/861.357 |
| 2016/0123792 A1* | 5/2016 | Plaziak | | G01F 25/0007 |
| | | | | 73/1.16 |
| 2017/0248461 A1* | 8/2017 | Plaziak | | G01F 25/0007 |

* cited by examiner

IN SITU TRANSDUCER CALIBRATION

FIELD OF THE INVENTION

The invention is related to the field of flowmeters, and in particular, to Coriolis flowmeters.

BACKGROUND

Nonlinear systems, such as those related to flowmeter harmonics, tend to distort signals. For example, if an input signal has strong frequency content at ω, then harmonic distortion produces an output signal with content at ω, 2ω, 3ω, etc. Related to this is the phenomenon of intermodulation (IM) distortion. IM distortion is seen when there are at least two input tones. In this case, the nonlinear system produces outputs not only at the harmonic frequencies, but also at linear combinations (e.g. sum and difference) of the input tones. These two phenomena are not mutually exclusive, and any nonlinear system that produces harmonic distortion for a single tone will produce IM distortion for multiple tones. The harmonic tones are actually a subset of the IM distortion tones.

By way of example, a velocity transducer, such as a voice coil transducer suitable for a flowmeter, may have an output described as:

$$y(t) = k\dot{x}(t) \quad (1)$$

The gain, k, is usually treated as a constant (gain is also known as the BL coefficient). In the case of voice coil transducers, due to the varying engagement of the permanent magnet with respect to the coil, the transducer gain is actually a function of position, where transducer strength drops as the magnet moves away from the coil's center. An example mathematical model that describes this behavior is:

$$k(x) = 1 - x^2 \quad (2)$$

For this transducer model to be accurate, the transducer's position must be restricted to a particular range (in this case, $|x| \leq 1$). To observe the effects of IM distortion, an example case where the input to the system is two pure frequencies may be described as:

$$x(t) = A_1 \cos(\omega_1 t) + A_2 \cos(\Omega_2 t) \quad (3)$$

Substituting equations (3) and (2) into (1), the output may be computed:

$$y(t) = \dot{x}(t)(1 - x^2(t)) = [-A_1 w_1 \sin(\omega_1 t) - A_2 \omega_2 \sin(\omega_2 t)][1 - (A_1 \cos(\omega_1 t) + A_2 \cos(\omega_2 t))^2] \quad (4)$$

Expression (4) can be simplified by expanding the products, and then repeatedly applying the trigonometric identities for products of sines and cosines, for example:

$$\cos\theta \cos\phi = \tfrac{1}{2}[\cos(\theta-\phi) + \cos(\theta+\phi)]$$

$$\cos\theta \sin\phi = \tfrac{1}{2}[\sin(\theta+\phi) - \sin(\theta-\phi)]$$

$$\sin\theta \sin\phi = \tfrac{1}{2}[\cos(\theta-\phi) - \cos(\theta+\phi)] \quad (5)$$

Expression (5) may be further simplified to:

$$\left[-\omega_1\left(A_1 + \frac{A_1^3}{4} + \frac{A_1 A_2^2}{2}\right)\right]\sin(\omega_1 t) + \left[-\omega_2\left(A_2 + \frac{A_2^3}{4} + \frac{A_1^2 A_2}{2}\right)\right]\sin(\omega_2 t) + \left[(\omega_2 - \omega_1)\left(\frac{A_1^2 A_2}{4}\right)\right] \quad (6)$$

$$\sin(2\omega_1 - \omega_2) + \left[(\omega_1 - \omega_2)\left(\frac{A_1 A_2^2}{4}\right)\right]\sin(2\omega_2 - \omega_1) +$$

$$\left[-(\omega_1 + \omega_2)\left(\frac{A_1^2 A_2}{4}\right)\right]\sin(2\omega_1 + \omega_2) + \left[-(\omega_1 + \omega_2)\left(\frac{A_1 A_2^2}{4}\right)\right]\sin$$

$$(2\omega_2 + \omega_1) + \left[-\omega_1\left(\frac{A_1}{4}\right)\right]\sin(3\omega_1 t) + \left[-\omega_2\left(\frac{A_2}{4}\right)\right]\sin(3\omega_2 t)$$

Expression (6) represents the sine waves of specific amplitudes at eight different frequencies, corresponding to particular linear combinations of the two tones. With the amplitudes, frequencies, and phases all being predictable, it is possible to describe the behavior of IM.

Transducer nonlinearity is modeled herein as a polynomial. According to Taylor's theorem, any sufficiently smooth (i.e. differentiable) function can be approximated by polynomials. Such a polynomial form exists for most any nonlinearity expected to be encountered by the majority of flowmeter transducers. It has been observed that lower-order polynomial terms tend to dominate behavior for the flowmeter transducers described herein. Thus, for practical applications, an appropriate maximum polynomial order (e.g. $4^{th}$-$8^{th}$) is preferable, though not mandatory.

This system nonlinearity may be modeled in terms of the input/output, or some number of derivatives or integrals of them. For instance, the voice coil transducers often employed by flowmeters measure velocity (considered to be the input/output space for the system), but are nonlinear according to position (the integral of velocity).

To handle IM distortion cases having any input frequencies, phases, and amplitudes, as well as any arbitrary nonlinearity polynomial, a few specific mathematical tools are briefly explained below in anticipation of their use in embodiments.

When expanding higher order terms of the polynomial, the input signal (or some derivative/integral of it) is raised to higher powers. Since embodiments are focused on multi-tonal signals, the input will be the sum of some number of terms. Thus, a closed-form expansion of the following expression is utilized:

$$(x_0 + x_1 + x_2 + \ldots + x_n)^k \quad (7)$$

For large powers of k, or a large number of terms n, this can yield difficult calculations. However, this problem is a generalization of the more widely-known binomial expansion, $(a+b)^k$. The binomial expansion produces k+1 terms, consisting of all combinations of powers of a and b that sum to k: $a^k$, $a^{k-1}b$, $a^{k-2}b^2$, ..., $ab^{k-1}$, $b^k$. The multinomial expansion then consists of all combinations of powers of $x_0$, $x_1$, ... $x_n$ that sum to k. This multinomial expansion can be readily implemented using a recursive algorithm. Basically, the first term, $x_0$, is looped through all allowed powers for it, from 0 to k. Then, for each allowed power of $x_0$, looped through the allowed values of $x_1$, from 0 to k minus the selected power for $x_0$. Powers for subsequent terms are selected, terminating each path once the total power reaches k. Each valid combination of powers is noted in the full multinomial expansion array. Once all the loops have completed, every valid expansion term will have been computed.

The number of terms in the expansion can grow quite rapidly if either the power k or the number of terms n gets large. The problem is n-choose-k with replacement; that is, picking k items from a group of n, where a given item can be picked multiple times. The n-choose-k problem is a well-known construct in probability; thus, by simply consulting a reference, the number of terms produced by the multinomial expansion may be written as:

$$\binom{n+k-1}{k} = \frac{(n+k-1)!}{(n-1)!k!} \qquad (8)$$

For example, without limitation, a five-term input raised to the fourth power will produce 70 terms, while a six-term input raised to the seventh power will produce 792 terms.

In addition to figuring out the terms present in a multinomial expansion, it is also necessary to compute the coefficients associated with this expansion. Returning to the binomial example:

$$(a+b)^2 = a^2 + 2ab + b^2$$

$$(a+b)^3 = a^3 + 3a^2b + 3ab^2 + b^3$$

$$(a+b)^4 = a^4 + 4a^3b + 6a^2b^2 + 4ab^3 + b^4 \qquad (9)$$

The coefficients of the expansion follow a predictable pattern as the exponent increases—these coefficients are often referred to as Pascal's triangle. Individual coefficients are found using Pascal's rule:

$$(a+b)^2 = \sum_{k=0}^{n} \binom{n}{k} a^{n-k} b^k \qquad (10)$$

Again, there is fortunately a generalization of this formula to an arbitrary multinomial case. In the multinomial expansion, the coefficient associated with the term $x_0^{k_0} x_1^{k_1} \ldots x_m^{k_m}$ is computed as:

$$\frac{n!}{k_0! k_1! \cdots k_m!} \qquad (11)$$

where, by the nature of the multinomial expansion, $k_0 + k_1 + \ldots + k_m = n$.

Multinomial expansion of sinusoid input tones will result in terms that are the product of a number of sines and cosines, for example:

$$\cos^2 \omega_1 t \cdot \sin \omega_1 t \qquad (12)$$

To simplify and combine the results from various terms of the expansion, these need to be converted into independent sums of sines and cosines. This can be done by repeatedly applying the identities of expression (5), and by expressing the product as individual sines and cosines, and then repeatedly applying the identities:

$$((\cos \omega_1 t \cdot \cos \omega_1 t) \sin \omega_1 t)$$

$$\tfrac{1}{2}((1 + \cos 2\omega_1 t) \sin \omega_1 t)$$

$$\tfrac{1}{2}(\sin \omega_1 t + \tfrac{1}{2}(\sin 3\omega_1 t - \sin \omega_1 t)) \qquad (13)$$

Additional terms result in a more complicated expansion, but follow the same fundamental rules. By the nature of the trigonometric identities used, the entire expansion will end up being represented as either sines or cosines. This repeated application of these identities ends up being relatively simple to implement in a loop, maintaining vectors of the frequencies and amplitudes produced. In general, each product doubles the number of terms in the reduced summation, but many of the terms end up being at the same frequency and hence combinable (e.g. the two $\sin \omega_1 t$ terms in (13)), and even more so if one accounts for the equivalence of positive and negative frequencies:

$$\cos(-\omega t) = \cos(\omega t)$$

$$\sin(-\omega t) = -\sin(\omega t) \qquad (14)$$

A flowmeter and/or associated electronics that can predict all the tones (including frequency, magnitude, and phase) produced by a system, given a polynomial model of system nonlinearity and a set of input tones to the system, is provided and an advance in the art is achieved. More particularly, transducers used in a flowmeter typically have significant variability in their strength—as much as 20-30% on notionally "identical" transducers. This variability is thought to be mostly due to variable magnet strengths, but can also result from differing engagement points of the at-rest transducer, due to variability in the manufacturing process. Additionally, transducer strength may vary due to field conditions, such as elevated temperature, for example. The apparatus and methods described herein provide a way to determine the transducer strength in real, physical units, based solely on electrical measurements. In this way, transducers can be calibrated based on measurements made with on-board flowmeter electronics rather than requiring specialized equipment. This also allows on-demand and/or periodic recalibration of fully assembled flowmeters.

SUMMARY OF THE INVENTION

A method for calibrating a flowmeter transducer is provided according to an embodiment. The method comprises the steps of exciting a vibration mode of a flowmeter flow tube and ceasing to excite the vibration mode. A free decay response of the flow tube is measured, and amplitudes and phases of the free decay response are extracted at a drive frequency. A strength of the transducer is then calculated.

A vibratory flowmeter is provided according to an embodiment. The flowmeter comprises a sensor assembly including one or more flow tubes and first and second pickoff sensors as well as first and second drivers configured to vibrate the one or more flow tubes. Meter electronics are coupled to the first and second pickoff sensors and coupled to the first and second drivers, with the meter electronics being configured to provide a first signal to the first and second drivers. The first and second drivers are configured to excite a vibration mode of the one or more flow tubes, wherein the vibration mode excitation is ceased and a free decay response of the one or more flow tubes is measured, and wherein the meter electronics is further configured to derive a polynomial nonlinearity model and calculate a strength of at least the first and second pickoff sensors.

Aspects

According to an aspect, a method for calibrating a flowmeter transducer comprises exciting a vibration mode of a flowmeter flow tube; ceasing to excite the vibration mode; measuring a free decay response of the flow tube; extracting amplitudes and phases of the free decay response at a drive frequency; and calculating a strength of the transducer.

Preferably, the flowmeter is excited at resonance.

Preferably, the method comprises the step of determining transducer peak velocity.

Preferably, the transducer comprises a driver.

Preferably, the transducer comprises a pickoff sensor.

Preferably, the transducer comprises a driver collocated with a pickoff sensor.

Preferably, the method comprises the steps of: deriving a polynomial nonlinearity; providing a reference curve; modeling a curve for the polynomial nonlinearity model; and fitting the measured nonlinearity model onto the reference curve.

Preferably, the method comprises the step of calibrating meter electronics to compensate for transducer strength.

Preferably, the method comprises the step of flowing a process fluid through the flow tube; and measuring process fluid flow.

According to an aspect, a vibratory flowmeter comprises a sensor assembly including one or more flow tubes and first and second pickoff sensors; first and second drivers configured to vibrate the one or more flow tubes; and meter electronics coupled to the first and second pickoff sensors and coupled to the first and second drivers, with the meter electronics being configured to provide a first signal to the first and second drivers wherein the first and second drivers are configured to excite a vibration mode of the one or more flow tubes, wherein the vibration mode excitation is ceased and a free decay response of the one or more flow tubes is measured, and wherein the meter electronics is further configured to derive a polynomial nonlinearity model and calculate a strength of at least the first and second pickoff sensors.

Preferably, the meter electronics is configured to calculate an amplitude of the free decay response and to calculate a phase of the free decay response.

Preferably, the first pickoff sensor and the first driver are collocated, and the second pickoff sensor and the second driver are collocated.

Preferably, the meter electronics is configured to provide a reference curve and model a curve for the polynomial nonlinearity model, wherein the measured nonlinearity model is fit to the reference curve.

Preferably, the meter electronics is configured to calibrate meter electronics to compensate for transducer strength.

Preferably, the vibratory flowmeter comprises a process fluid in the flow tube, and wherein the meter electronics is configured to measure a flow of the process fluid.

Preferably, the meter electronics is configured to adjust the nonlinearity polynomial to compensate for measured harmonics.

DETAILED DESCRIPTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
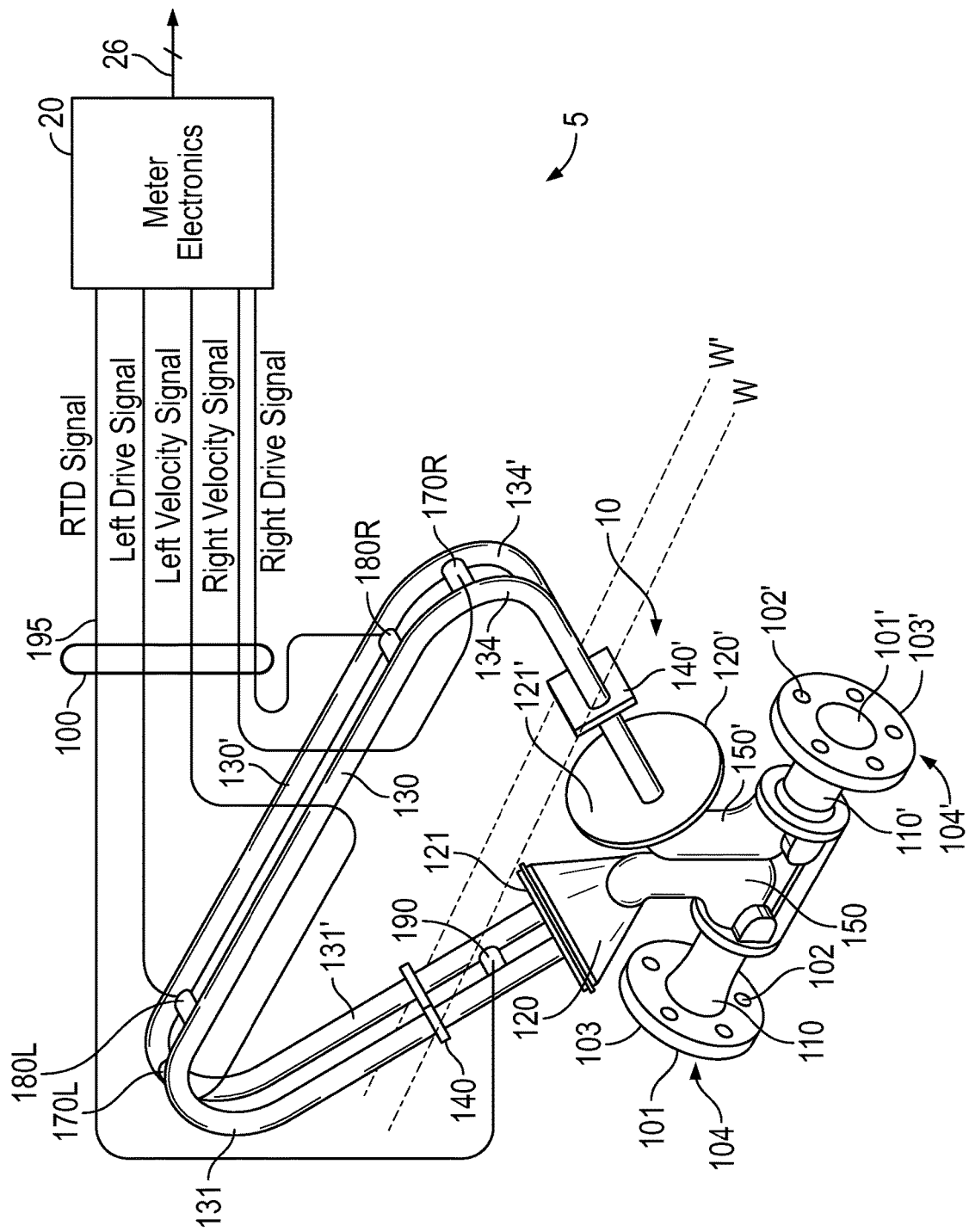
FIG. 1 is a vibratory flowmeter according to an embodiment.

FIG. 1 shows a vibratory flowmeter 5 according to an embodiment. The flowmeter 5 comprises a sensor assembly 10 and meter electronics 20 coupled to the sensor assembly 10. The sensor assembly 10 responds to mass flow rate and density of a process material. The meter electronics 20 is connected to the sensor assembly 10 via the leads 100 to provide density, mass flow rate, and temperature information over a communication link 26, as well as other information. A Coriolis flowmeter structure is described, although it is apparent to those skilled in the art that the present invention could also be operated as a vibrating tube densitometer.

The sensor assembly 10 includes manifolds 150 and 150', flanges 103 and 103' having flange necks 110 and 110', parallel flow tubes 130 and 130', first and second drivers 180L and 180R, and first and second pickoff sensors 170L and 170R (for brevity, the drivers 180L, 180R and pickoff sensors 170L, 170R may herein be collectively referred to as "transducers"). The first and second drivers 180L and 180R are spaced apart on the one or more flow tubes 130 and 130'. In addition, in some embodiments the sensor assembly 10 may include a temperature sensor 190. The flow tubes 130 and 130' have two essentially straight inlet legs 131 and 131' and outlet legs 134 and 134' which converge towards each other at the flow tube mounting blocks 120 and 120'. The flow tubes 130 and 130' bend at two symmetrical locations along their length, and are essentially parallel throughout their length. The brace bars 140 and 140' serve to define the axis W and the substantially parallel axis W' about which each flow tube 130, 130' oscillates. It should be noted that in an embodiment, the first driver 180L may be collocated with the first pickoff sensor 170L, the second driver 180R may be collocated with the second pickoff sensor 170R.

The side legs 131, 131' and 134, 134' of the flow tubes 130 and 130' are fixedly attached to flow tube mounting blocks 120 and 120' and these blocks, in turn, are fixedly attached to the manifolds 150 and 150'. This provides a continuous closed material path through the sensor assembly 10.

When the flanges 103 and 103', having fastener holes 102 and 102' are connected, via the inlet end 104 and the outlet end 104' into a process line (not shown) which carries the process material that is being measured, material enters an inlet end 104 of the flowmeter 5 through an orifice 101 in the flange 103, and is conducted through the manifold 150 to the flow tube mounting block 120 having a surface 121. Within the manifold 150, the material is divided and routed through the flow tubes 130 and 130'. Upon exiting the flow tubes 130 and 130', the process material is recombined in a single stream within the manifold 150' and is thereafter routed to the outlet end 104' connected by the flange 103' to the process line (not shown) via orifice 101'.

The flow tubes 130 and 130' are selected and appropriately mounted to the flow tube mounting blocks 120 and 120' so as to have substantially the same mass distribution, moments of inertia, and Young's modulus about the bending axes W-W and W'-W', respectively. These bending axes go through the brace bars 140 and 140'. Inasmuch as the Young's modulus of the flow tubes change with temperature, and this change affects the calculation of flow and density, the temperature sensor 190, which may be a resistive temperature detector (RTD) is mounted to a flow tube 130, 130', to continuously measure the temperature of the flow tube 130, 130'. The temperature-dependent voltage appearing across the temperature sensor 190 may be used by the meter electronics 20 to compensate for the change in the elastic modulus of the flow tubes 130 and 130' due to any changes in flow tube temperature. The temperature sensor 190 is connected to the meter electronics 20 by the lead 195.

Given input tone information (frequencies, amplitudes, and phases) and a polynomial model of system nonlinearity, meter electronics 20 returns output tones (frequencies, amplitudes, and phases) from the system. In an embodiment, arbitrary-phase sinusoids are expressed as the weighted sum of a cosine and sine component.

The input is assumed to be a sum of sinusoids:

$$x(t) = \sum_i A_i \cos\omega_i t + \sum_j B_j \sin\omega_j t \qquad (15)$$

System nonlinearity is modeled with a polynomial of the input/output space, or some number of integrals/derivatives of this space (e.g. one might be measuring acceleration, but the system is nonlinear in terms of position). Denoting the "nonlinearity space" as $\hat{x}$, system response is written as:

$$y(t) = P(\hat{x}(t))x(t) \qquad (16)$$

where P is the nonlinearity polynomial:

$$P(\hat{x}) = \sum_k P_k \hat{x}^k \qquad (17)$$

Meter electronics 20 may iterate over different levels of computation. At the highest level, the iterations are over the terms in the polynomial. By distributing input x into the terms of the polynomial, the output can be written as the sum of several independent terms:

$$y(t) = \sum_k P_k \hat{x}(t)^k x(t) \qquad (18)$$

Thus, the output for each polynomial coefficient is computed separately, finally combining the results at the end.

There is a need then for each polynomial term to compute the full expansion of $\hat{x}(t)^k$. Recall that x, and therefore $\hat{x}$ as well, are assumed to be a sum of sinusoid terms. Thus $\hat{x}^k$ is a standard multinomial expansion whose terms are sines and cosines. The terms of the expansion may be computed using the multinomial term technique noted herein, for example without limitation. Given this expansion of $\hat{x}^k$, then each term of the expansion is multiplied by x. This yields all the terms associated with $\hat{x}^k x$. At this point, the n terms are summed together, each of which is the product of a plurality of sines and cosines.

The next step is to enter a second level iterative loop, evaluating each term of the expansion. For each term, the multinomial coefficient is computed (i.e. the multiplier of each term, based solely on the pattern of how $\hat{x}^k$ expands), and then multiplied by the polynomial coefficient $P_k$ and the amplitudes of the sines and cosines contributing to that term. As noted above, the multinomial coefficient calculation forms a scalar associated with this particular term of the expansion. The term of this expansion is simply a product of several sines and cosines. This is then converted into the sum of sines or cosines at various frequencies. Information on these sinusoids (frequency, amplitude, and sine/cosine) is retained and carried over to the next term of expansion.

Once the above procedures are completed for every term of the expansion (i.e. the inner loop), and for every polynomial coefficient (i.e. the outer loop), the result is a large number of sines and cosines, at specific frequencies and with specific amplitudes, which are then collated. Any negative-frequency sinusoids are converted to their positive frequency equivalents, and sines and cosines of like frequencies are summed together. The amplitudes and frequencies of these sines and cosines are returned, forming the full output.

Figure 2:
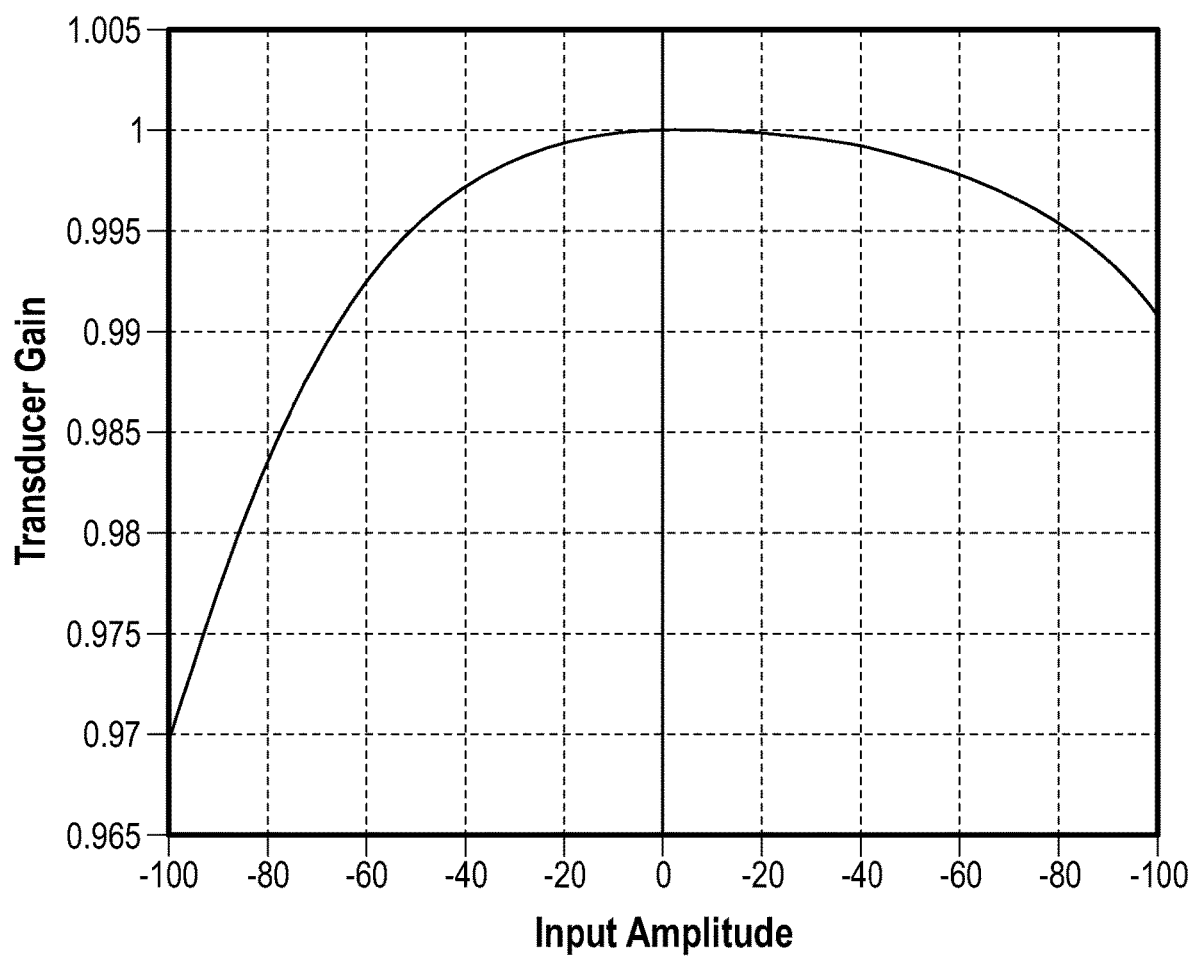
FIG. 2 illustrates a $4^{th}$ order asymmetric polynomial transducer model.
Figure 3A:
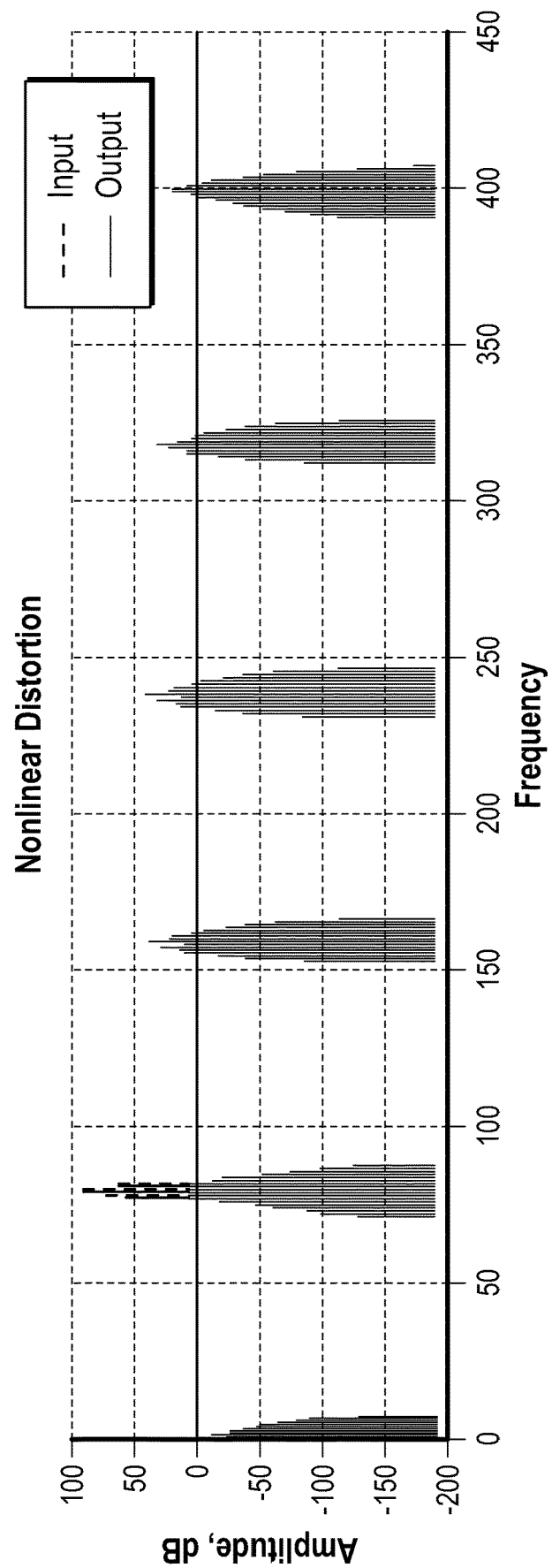
FIG. 3A illustrates an intermodulation distortion model for a 5-tone system.
Figure 3B:
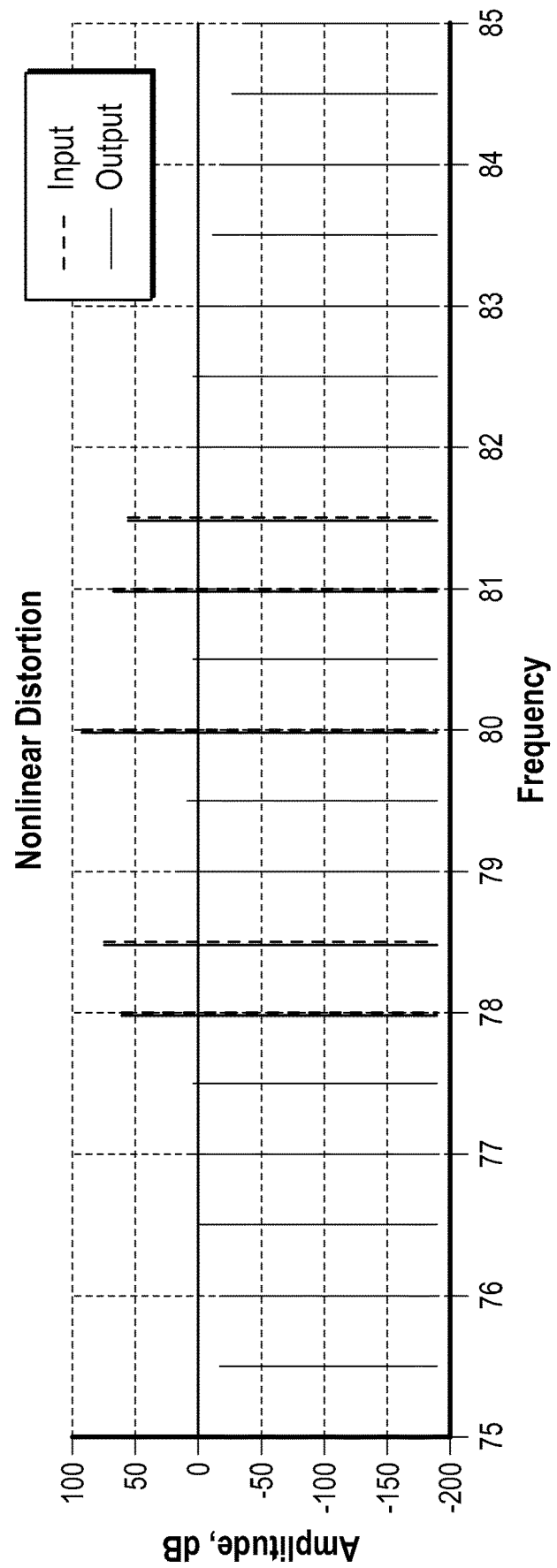
FIG. 3B illustrates a zoomed-in view of the intermodulation distortion model of FIG. 3A.
Figure 4A:
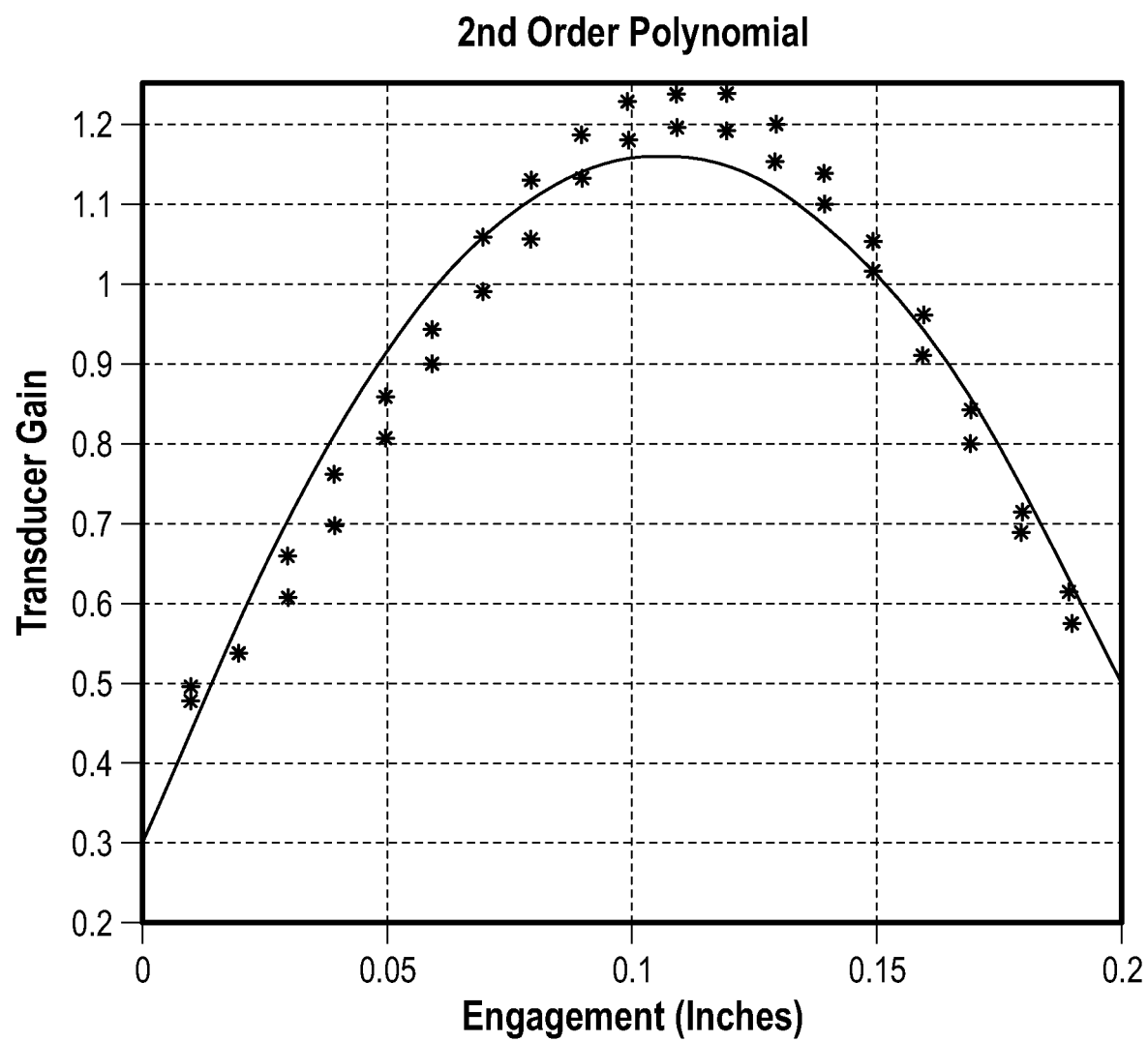
FIG. 4A illustrates raw data from a pull curve test, having a $2^{nd}$ order polynomial fit.
Figure 4B:
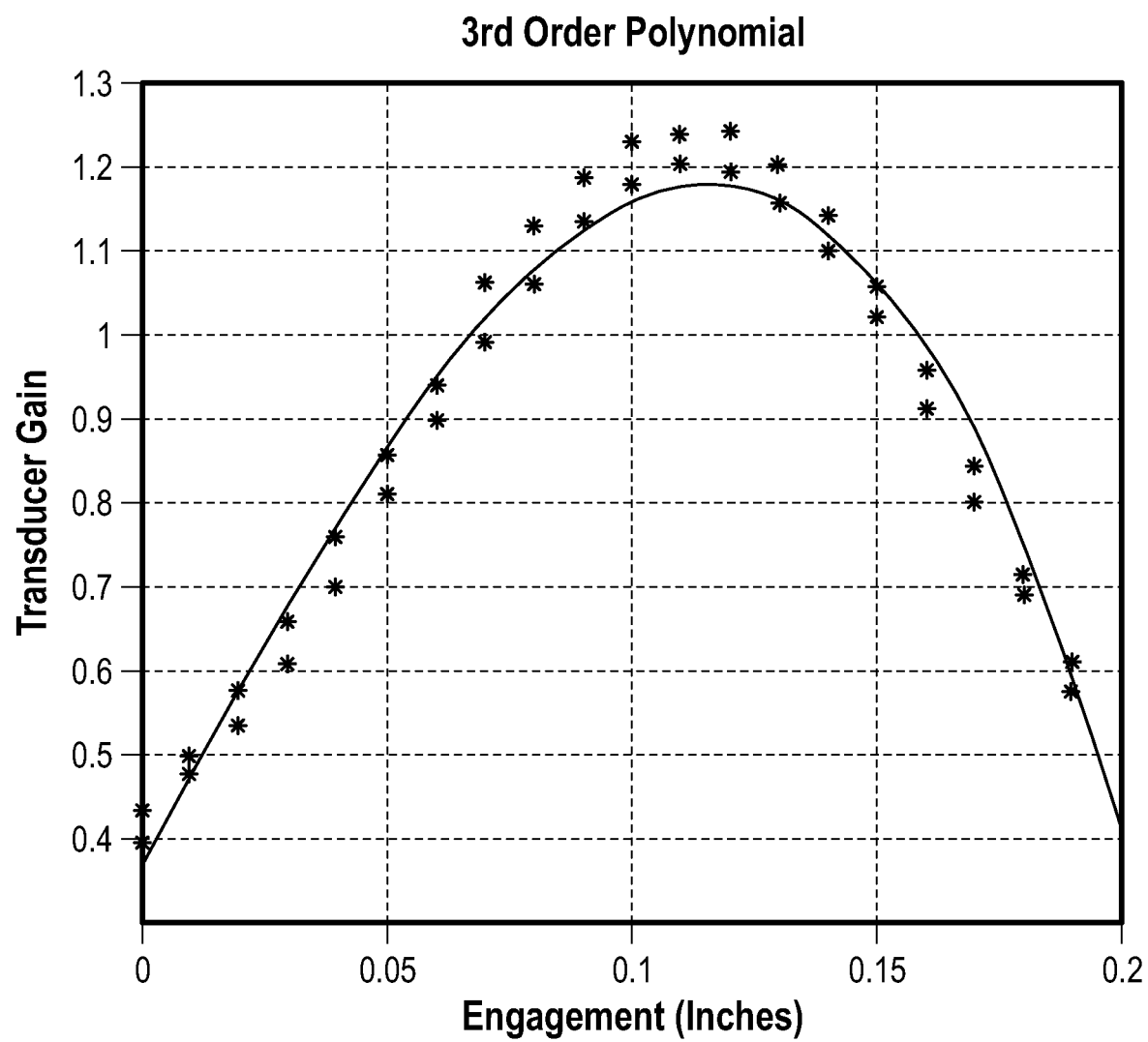
FIG. 4B illustrates the raw data from the pull curve test of FIG. 4A, having a $3^{rd}$ order polynomial fit.
Figure 4C:
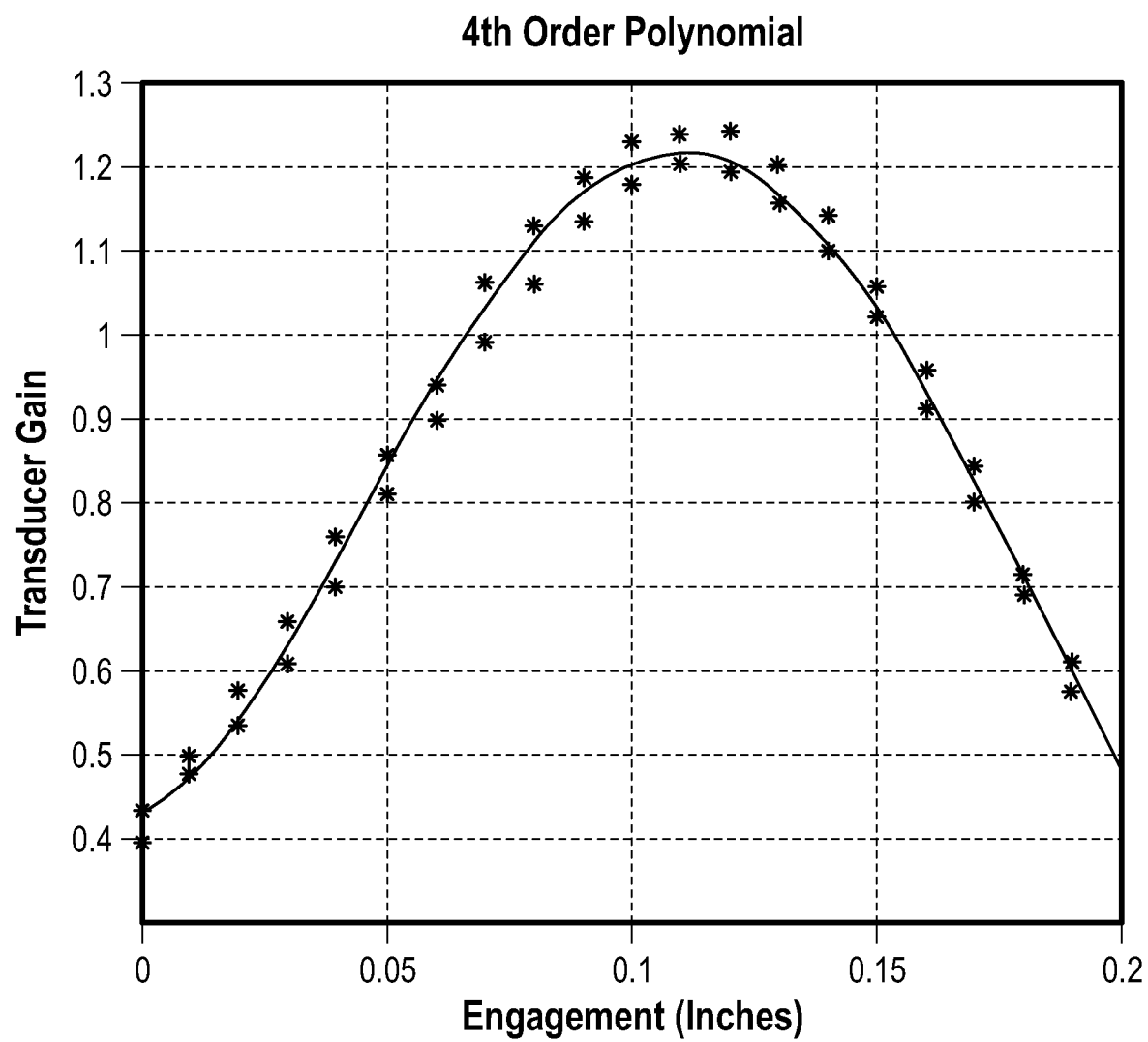
FIG. 4C illustrates the raw data from the pull curve test of FIG. 4A, having a $4^{th}$ order polynomial fit.
Figure 4D:
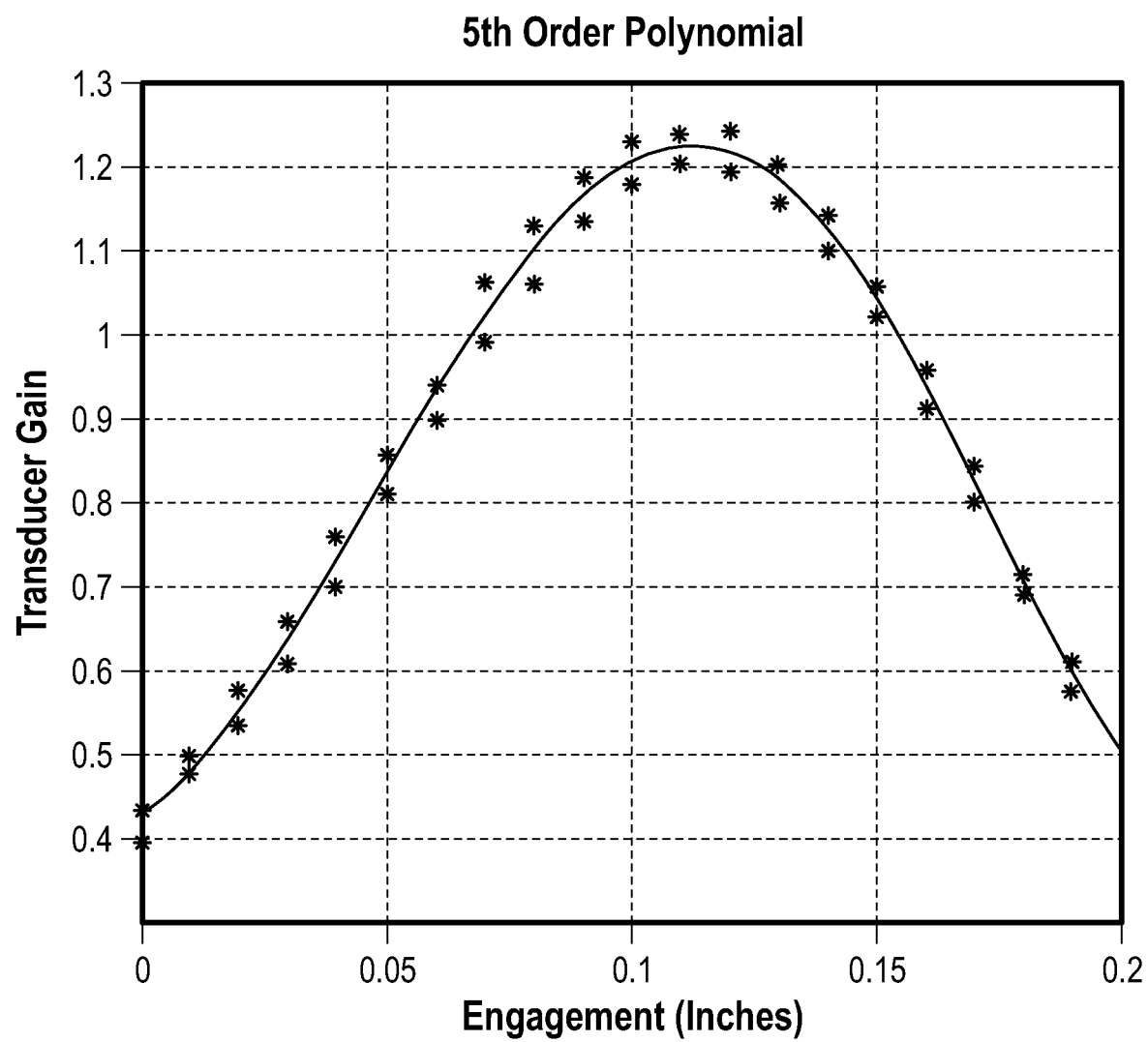
FIG. 4D illustrates the raw data from the pull curve test of FIG. 4A, having a $5^{th}$ order polynomial fit.

Meter electronics 20 can therefore produce fairly complex characteristics. Turning to FIG. 2, an example illustrating a 5-tone input centered around 80 Hz is presented, displaying a somewhat exaggerated transducer nonlinearity model utilizing a $4^{th}$ order polynomial. The resulting overall system output is shown in FIG. 3A, and zoomed-in to an input frequency band in FIG. 3B. Certain IM tones near the input tones have substantial amplitude (about 30 dB below input tones), yet others further from the inputs corresponding to higher-order polynomial terms are of much lower amplitude (many are 100-200 dB below the input tones).

Transducer nonlinearities may be modeled via a lookup table derived from a polynomial model. A model is fit to pull curve data and the resulting polynomial model is returned, which is fit to the square of the measured pull curve data. This is an approximation, but the nonlinear transducer effect is applied twice—once to apply force to the system, and then again to measure the velocity. Traditional flowmeters use separate transducers for driver and pickoff sensors, with different pull curves and different vibration amplitudes. However, in an embodiment, collocated transducers are employed, which thus have roughly the same pull curve characteristics and vibration amplitude. This double effect can be approximated by simply squaring the standard pull curve results.

The adjustable parameters for the polynomial fit are primarily the order of the fit and whether the at-rest position is at the peak of the curve, or if there is an offset. FIGS. 4A-4D illustrate raw data from a pull curve test, along with polynomial fits of several orders. Based on these results, the $4^{th}$ order polynomial fit comprises sufficient fidelity, which is advantageous, as higher-order polynomials would have produced much longer runtimes, with calculations taking hours rather than minutes to complete, for example, depending on computing device performance. Once the $4^{th}$ degree polynomial fit is obtained, the polynomial is re-centered so that the maximum value occurs at zero engagement, and the maximum gain may be normalized.

A nonlinearity model may be derived from measurement data by simply inverting the IM tone synthesis process noted herein. For convenience, complex number notations to denote sines and cosines are used:

$$A \cos \omega t \rightarrow A$$

$$B \sin \omega x \rightarrow jB \qquad (19)$$

Another notational convenience will be the use of the symbol R for the coefficients of the expansion of a sinusoid raised to a power. Depending on k, either $\cos^{p+1} \omega t$ or $\cos \omega t \cdot \sin^p \omega t$ may be expanded. However, in either case, $R_{kpf}$ is used to denote the coefficient of the expansion for power p to a term with frequency $f \cdot \omega$. For instance, a simple application of trigonometric identities shows that $\cos \omega t \cdot \cos^2 \omega t = \cos^3 \omega t = 0.75 \cos \omega t + 0.25 \cos 3\omega t$. Thus, for this case, $R_{021} = 0.75$ and $R_{023} = 0.25$. As an alternate example, $\cos \omega t \cdot \sin^2 \omega t = 0.25 \cos \omega t - 0.25 \cos 3\omega t$. In this case, $R_{121} = 0.25$ and $R_{123} = -0.25$. Note that for the purposes of defining R, it only matters if k is even or odd; that is, $R_{0\ pf} = R_{2\ pf} = R_{-4\ pf}$ and $R_{1\ pf} = R_{3\ pf} = R_{-5\ pf}$. Specific coefficient values for arbitrary values of p and f can therefore be found. It is worth noting that even values of p produce only odd multiples of the base frequency, and odd values of p produce only even multiples.

The issue of whether the integrated/differentiated value is a sine or cosine based on the value of k in $R_{kpf}$ is addressed, notwithstanding the frequency or the sign. For instance, $$\frac{d}{dt} \cos \omega t = -\omega \sin \omega t.$$

The conversion from cosine to sine is handled by the R coefficient, but the $-\omega$ factor must still be accounted for. In general, k is used to denote the number of derivatives (positive) or integrals (negative) from the measurement space to the nonlinearity space, so the amplitude in the nonlinearity space is written as $s_k A \omega^k$, where A is the original signal's amplitude and $s_k$ is the appropriate sign. For example, if the original acceleration signal was $A \cos \omega t$, then its position is $-A/\omega^2 \cos \omega t$. In simplified notation, this is a cosine of amplitude $s_{-2} A \omega^{-2} = -A \omega^{-2}$. As another example, a position of $A \cos \omega t$ becomes a velocity of $-A\omega \sin \omega t$, or in simplified notation, a sine with amplitude $s_1 A \omega^1 = -A \omega$.

It should also be noted that the nonlinearity polynomial is given as $y = P_n x^n + P_{n-1} x^{n-1} + \ldots P_1 x + P_0$, and the system response to a tonal input $A \cos \omega t$ is written as $H_0 + H_1 \cos \omega t + H_2 \cos 2\omega t + \ldots + H_n \cos n\omega t$. Sine components may be incorporated via imaginary values of the coefficients H.

Using the mathematics derived above, a matrix equation for computing the output of a nonlinear system to a pure tonal input $A \cos \omega t$ may be developed. This system is nonlinear in a particular space and k derivates from the input measurement (negative k for integrals), as shown:

$$\begin{bmatrix} 0 & A^4(s_k\omega^k)^3 R_{30} & 0 & A^2(s_k\omega^k) R_{10} & 0 \\ A^5(s_k\omega^k)^4 R_{41} & 0 & A^3(s_k\omega^k)^2 R_{21} & 0 & AR_{01} \\ 0 & A^4(s_k\omega^k)^3 R_{32} & 0 & A^2(s_k\omega^k) R_{12} & 0 \\ A^5(s_k\omega^k)^4 R_{43} & 0 & A^3(s_k\omega^k)^2 R_{23} & 0 & 0 \\ 0 & A^4(s_k\omega^k)^3 R_{34} & 0 & 0 & 0 \\ A^5(s_k\omega^k)^4 R_{45} & 0 & 0 & 0 & 0 \end{bmatrix} \qquad (20)$$

$$\begin{bmatrix} P_4 \\ P_3 \\ P_2 \\ P_1 \\ P_0 \end{bmatrix} = \begin{bmatrix} H_0 \\ H_1 \\ H_2 \\ H_3 \\ H_4 \\ H_5 \end{bmatrix}$$

Examining any single row of the matrix yields an equation such as:

$$P_4 A^5 (s_k \omega^k)^4 R_{43} + P_2 A^3 (s_k \omega^k)^2 R_{23} = H_3 \qquad (21)$$

In this example, assume $k=-1$ (e.g. a velocity transducer nonlinear in position). The basic nonlinearity equation is $$y(t) = \sum_r P_r \dot{x}(t) x^r(t),$$

with $\dot{x}(t) = A \cos \omega t$ and thus, $x(t) = A/\omega \sin \omega t$. Since this is for the third harmonic frequency of the output, this reflects only contributions for even values of R that are 2 or larger (2 or 4, since in this case R only goes up to 4). Thus, a contribution from the terms $P_2 (A \cos \omega t)(A\omega^{-1} \sin \omega t)^2$ and $P_4 (A \cos \omega t)(A\omega^{-1} \sin \omega t)^4$ are realized. This can be rewritten as $P_2 A^3 \omega^{-2} (\cos \omega t \sin^2 \omega t)$ and $P_4 A^5 \omega^{-4} (\cos \omega t \sin^4 \omega t)$. Recalling the definition of R, we can find the portions of these terms that contribute the third harmonic as $P_2 A^3 \omega^{-2} R_{23} \cos 3\omega t$ and $P_4 A^5 \omega^{-4} R_{43} \cos 3\omega t$. However, since $s_{-1} = 1$, this is what was given in equation (21).

With regard to the system of equations in matrix (20), the term $H_0$ is the DC measurement. For many real-world data acquisitions, reliable DC measurements are not available. Even if available, for any integral cases ($k<0$) the math becomes ill-conditioned at DC, and for derivative cases ($k>0$) the DC component must be zero. Thus, in practice, it may be necessary to drop the first row of the equation to yield a reduced set of equations:

$$\begin{bmatrix} A^5(s_k\omega^k)^4 R_{41} & 0 & A^3(s_k\omega^k)^2 R_{21} & 0 & AR_{01} \\ 0 & A^4(s_k\omega^k)^3 R_{32} & 0 & A^2(s_k\omega^k) R_{12} & 0 \\ A^5(s_k\omega^k)^4 R_{43} & 0 & A^3(s_k\omega^k)^2 R_{23} & 0 & 0 \\ 0 & A^4(s_k\omega^k)^3 R_{34} & 0 & 0 & 0 \\ A^5(s_k\omega^k)^4 R_{45} & 0 & 0 & 0 & 0 \end{bmatrix} \qquad (22)$$

$$\begin{bmatrix} P_4 \\ P_3 \\ P_2 \\ P_1 \\ P_0 \end{bmatrix} = \begin{bmatrix} H_1 \\ H_2 \\ H_3 \\ H_4 \\ H_4 \end{bmatrix}$$

Figure 5:
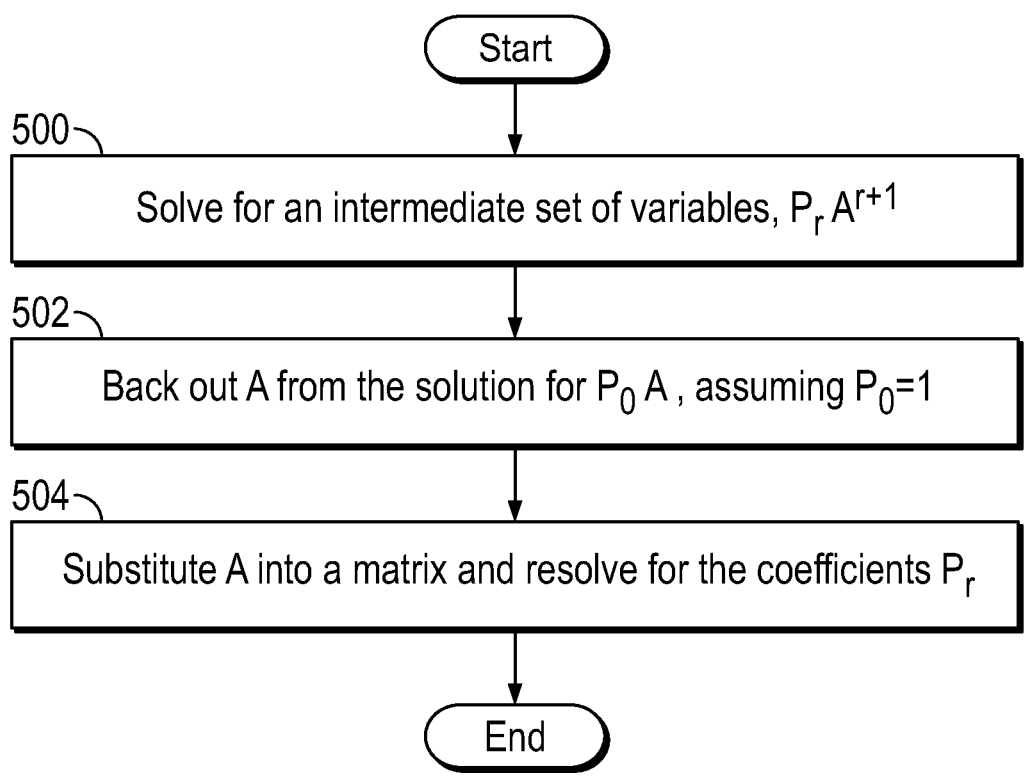
FIG. 5 illustrates a method of resolving unknown polynomial coefficients according to an embodiment.

Given the system of equations in equation (22), it may seem a simple matter to solve for the unknown polynomial coefficients, $P_r$, simply by left-multiplying both sides of the equation by the inverse of the weighting matrix. However, it is important to note that the variable A is not strictly known. A represents the "true" underlying behavior, independent of the nonlinear dynamics of the system. Assuming that we only have measurements from the nonlinear system, one does not directly know A. This is dealt with by requiring a flowmeter user to provide measurements in units that must scale the measurements to real physical units, in essence, forcing an assumption to be made regarding a true amplitude. More specifically, calculations assume that coefficient $P_0=1$. $P_0$ represents the y-intercept of the nonlinearity polynomial, thus, it is assumed that the provided measurements are correct "at rest" (at position 0). With this assumption, the system becomes solvable. FIG. 5 is a method illustrating this. In step 500, an intermediate set of variables, $P_r A^{r+1}$ is solved. In step 502, A is backed out from the solution for $P_0 A$, assuming $P_0=1$. Lastly, as shown in step 504, the computed value of A is substituted into a matrix such as (20) or (22) and resolved for the coefficients $P_r$, or simply the known value of A is applied to the solutions from step 502 to compute $P_r$.

Figure 6:
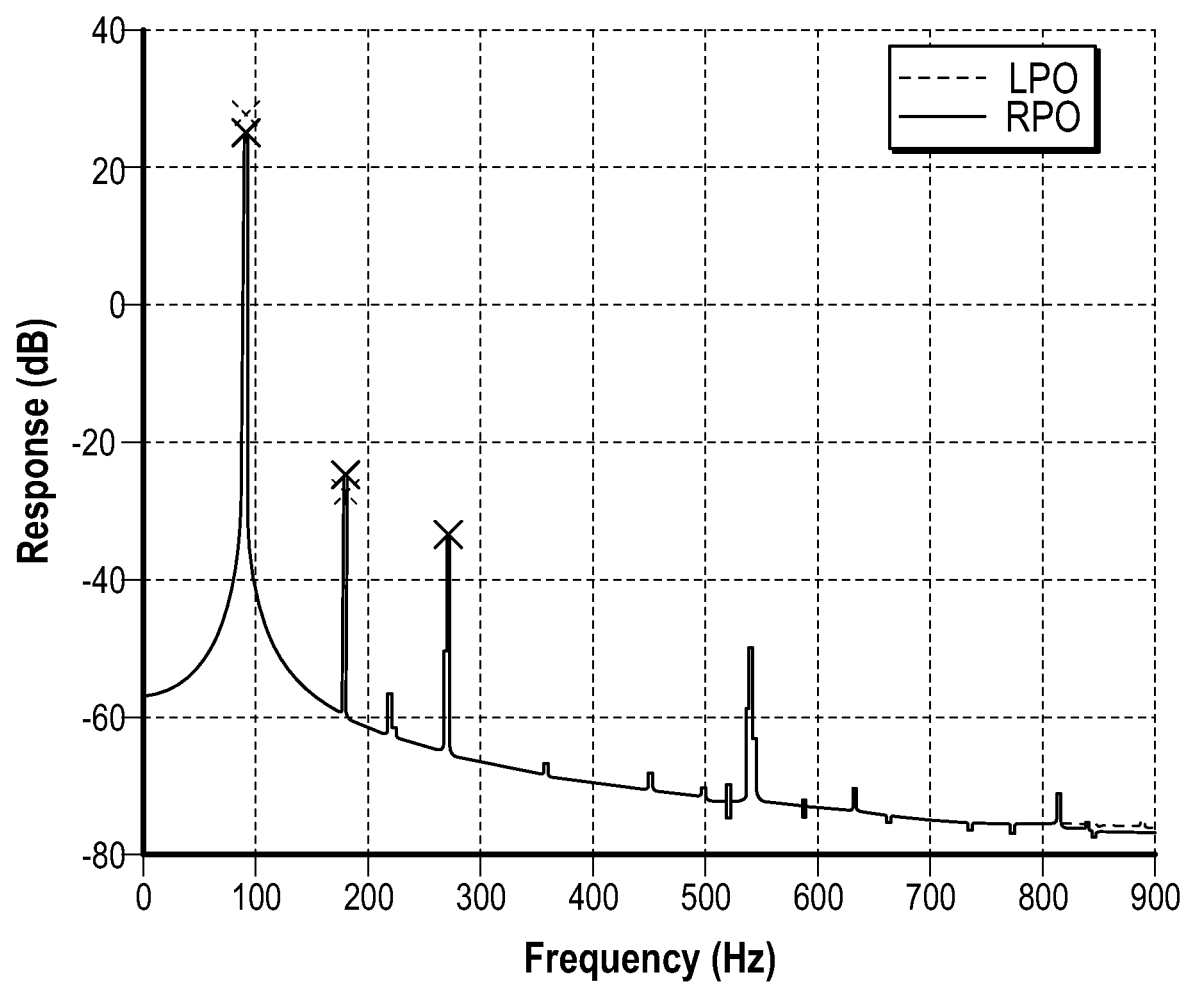
FIG. 6 illustrates drive frequency and relevant harmonics during flowmeter operation.
Figure 7:
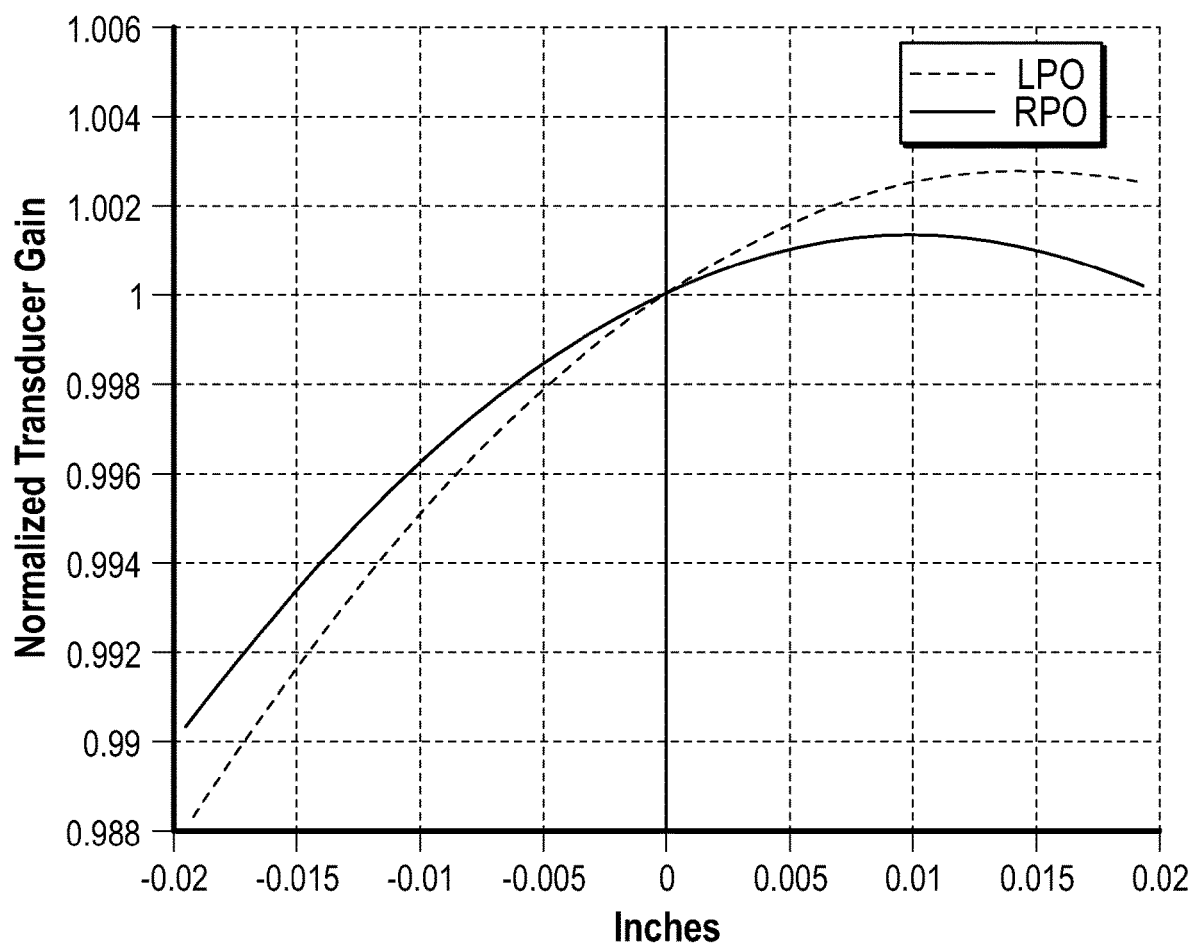
FIG. 7 illustrates synthesized transducer response curves.

Turning to FIG. 6, the amplitude and phase of significant harmonics are taken from a time history of the pickoff sensor 170L, 170R responses during standard operation of the flowmeter 5 (left pickoff sensor 170L is labeled LPO, and right pickoff sensor 170R is labeled RPO). These data were used to produce the transducer response curves shown in FIG. 7. These results show that flowmeter transducers exhibit significant changes in their strength as a function of engagement of their typical range of motion. Note that since the response used here is driven by a closed-loop drive and applied over a driver 180L, 180R (with its own nonlinearity), the results are probably not truly just the characteristics of the pickoff sensors 170L, 170R; rather, the plot generated likely comprises the multiplicative effects of the nonlinear driver 180L, 180R and pickoff sensors 170L, 170R.

Figure 8:
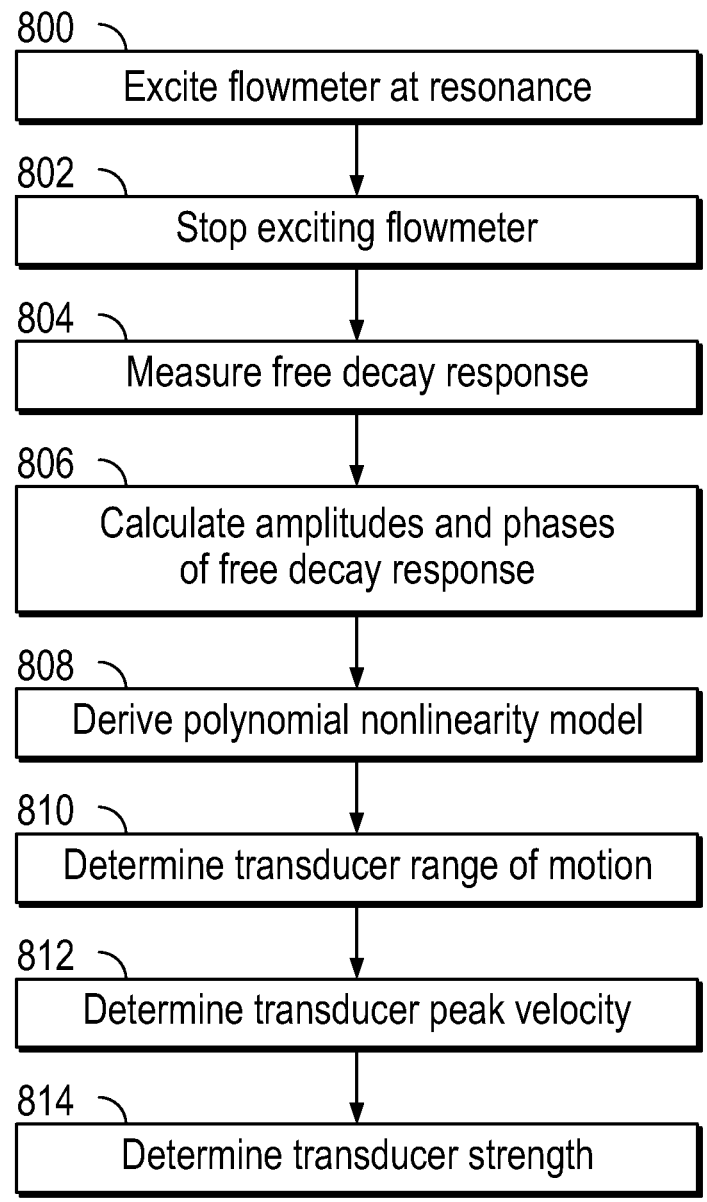
FIG. 8 illustrates a method for determining transducer strength according to an embodiment.

Turning to FIG. 8, an embodiment is illustrated for determining transducer strength. In step 800, a flowmeter 5 is excited at resonance. This may be effectuated by actuating a driver 180L, 180R, for example without limitation. Once the flowmeter 5 is being driven at a desired amplitude, the signal to drive the flowmeter 5 is halted, as indicated in step 802. In the next step, 804, the free decay response is measured via the pickoff sensors 170L, 170R. This is necessary to decouple the pickoff nonlinearity from that of the driver 180L, 180R. From this response data, the amplitudes and phases of the response at the drive frequency and its relevant harmonics are extracted, as shown by step 806. This is done at some point during the free decay. As amplitude drops during free decay, the flowmeter 5 will become more linear. The goal is to take measurements at some point while the flowmeter 5 is still significantly nonlinear, however the exact amplitude at which it is measured is not particularly important.

Given a set of harmonic amplitudes and phases, a polynomial nonlinearity model can be backed as described above and shown in step 808. Since the main expected sources of variation in the transducer's behavior are the magnet strength and the at-rest engagement point, the nonlinearity should look like that of a reference pull curve, where transducer strength is measured as a function of absolute engagement. The measured curve may have a different strength and may be located on a subsection of the reference curve, but it should be the same approximate shape. By fitting the measured nonlinearity model onto the reference curve, wherein the shape is a function of engagement, the range of motion that the transducer is undergoing may be determined, as reflected by step 810.

With the true range of motion known, the gain value may be determined. The range of motion can be combined with the primary drive frequency to determine the peak velocity in step 812. Combining this information with the peak voltage yields the transducer strength, in step 814, in voltage per velocity (which is equivalent to force per current), in absolute units.

Driver 180L, 180R strength can be backed out in the same manner if A/D hardware is available to measure the back-EMF it produces. Alternatively, once a nonlinearity model for the pickoff sensor 170L, 170R is derived, it is possible to calibrate the driver 180L, 180R based on the pickoff sensor 170L, 170R measurements. To do so, both the nonlinear effects of the pickoff sensor 170L, 170R and the effect of system's mechanical response must be removed.

The detailed descriptions of the above embodiments are not exhaustive descriptions of all embodiments contemplated by the inventor to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole, or in part, to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. The teachings provided herein can be applied to other vibrating systems, and not just to the embodiments described above and shown in the accompanying figures. Accordingly, the scope of the invention should be determined from the following claims.

I claim:

1. A vibratory flowmeter (5) comprising:
a sensor assembly (10) including one or more flow tubes (130, 130') and first and second pickoff sensors (170L, 170R);
first and second drivers (180L, 180R) configured to vibrate the one or more flow tubes (130, 130'); and
meter electronics (20) coupled to the first and second pickoff sensors (170L, 170R) and coupled to the first and second drivers (180L, 180R), with the meter electronics (20) being configured to provide a first signal to the first and second drivers (180L, 180R) wherein the first and second drivers (180L, 180R) are configured to excite a vibration mode of the one or more flow tubes (130, 130'), wherein the vibration mode excitation is ceased and a free decay response of the one or more flow tubes (130, 130') is measured, and wherein the meter electronics (20) is further configured to derive a polynomial nonlinearity model and calculate a strength of at least the first and second pickoff sensors (170L, 170R).

2. The vibratory flowmeter (5) of claim 1, wherein the meter electronics (20) is configured to calculate an amplitude of the free decay response and to calculate a phase of the free decay response.

3. The vibratory flowmeter (5) of claim 1, wherein the first pickoff sensor (170L) and the first driver (180L) are collocated, and the second pickoff sensor (170R) and the second driver (180R) are collocated.

4. The vibratory flowmeter (5) of claim 1, wherein the meter electronics (20) is configured to provide a reference curve and model a curve for the polynomial nonlinearity model, wherein the measured nonlinearity model is fit to the reference curve.

5. The vibratory flowmeter (5) of claim 4, wherein the meter electronics (20) is configured to calibrate meter electronics to compensate for transducer strength.

6. The vibratory flowmeter (5) of claim 5, comprising a process fluid in the flow tube, and wherein the meter electronics (20) is configured to measure a flow of the process fluid.

7. The vibratory flowmeter (5) of claim 5, wherein the meter electronics (20) is configured to adjust the nonlinearity polynomial to compensate for measured harmonics.

8. A method for calibrating a flowmeter transducer comprising the steps of:
   exciting a vibration mode of a flowmeter flow tube;
   ceasing to excite the vibration mode;
   measuring a free decay response of the flow tube;
   extracting amplitudes and phases of the free decay response at a drive frequency; and
   calculating a strength of the transducer.

9. The method of claim 8, wherein the flowmeter is excited at resonance.

10. The method of claim 8, comprising the step of determining transducer peak velocity.

11. The method of claim 8, wherein the transducer comprises a driver.

12. The method of claim 8, wherein the transducer comprises a pickoff sensor.

13. The method of claim 8, wherein the transducer comprises a driver collocated with a pickoff sensor.

14. The method of claim 8, comprising the steps of:
   deriving a polynomial nonlinearity;
   providing a reference curve;
   modeling a curve for the polynomial nonlinearity model; and
   fitting the measured nonlinearity model onto the reference curve.

15. The method of claim 14, comprising the step of calibrating meter electronics to compensate for transducer strength.

16. The method of claim 15, comprising the steps of:
   flowing a process fluid through the flow tube; and
   measuring process fluid flow.

* * * * *

UNITED STATES PATENT AND TRADEMARK OFFICE
CERTIFICATE OF CORRECTION

PATENT NO. : 10,670,446 B2
APPLICATION NO. : 15/763258
DATED : June 2, 2020
INVENTOR(S) : Matthew Joseph Rensing It is certified that error appears in the above-identified patent and that said Letters Patent is hereby corrected as shown below:

In the Specification

Column 1, Line 43, that portion of equation (3) reading "$\cos(\Omega_2 t)$" should read -- $\cos(\omega_2 t)$ --.

Column 3, Line 27, that portion of equation (10) reading "$(a + b)^2$" should read -- $(a + b)^n$ --.

Column 10, Line 59, that portion of equation (22) reading "$=\begin{bmatrix} H_1 \\ H_2 \\ H_3 \\ H_4 \\ H_4 \end{bmatrix}$" should read -- $=\begin{bmatrix} H_1 \\ H_2 \\ H_3 \\ H_4 \\ H_5 \end{bmatrix}$ --.

Signed and Sealed this
Tenth Day of November, 2020

Andrei Iancu
*Director of the United States Patent and Trademark Office*